N. PUCKETT.
Centering Tool.
No. 60,936. Patented Jan. 1, 1867.
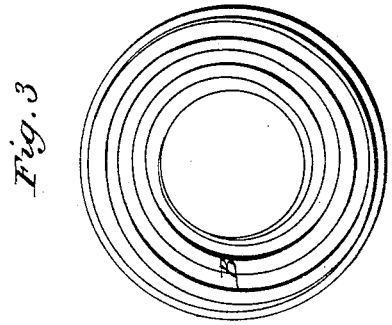
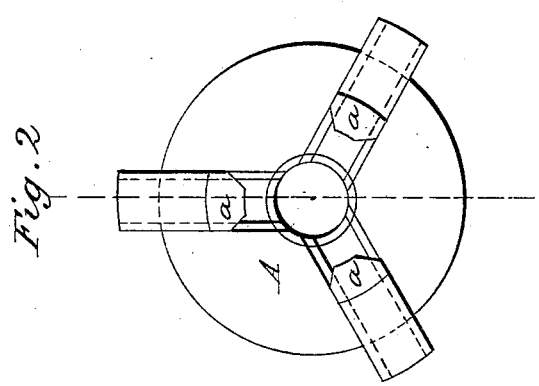
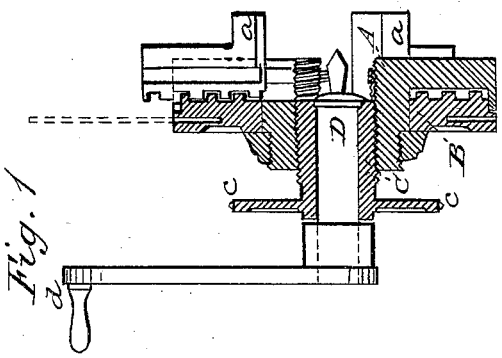
Witnesses:
F. A. Jackson
Theo Tusch
Inventor:
Nathan Puckett
per Munn & Co
Attorneys

United States Patent Office.

NATHAN PUCKETT, OF TERRE HAUTE, INDIANA.

Letters Patent No. 60,936, dated January 1, 1867.

IMPROVEMENT IN SELF-CENTERING TOOLS.

*The Schedule referred to in these Letters Patent and making part of the same.*

TO ALL WHOM IT MAY CONCERN:

Be it known that I, NATHAN PUCKETT, of Terre Haute, in the county of Vigo, and State of Indiana, have invented a new and improved Centering Tool; and I do hereby declare that the following is a full, clear, and exact description thereof, which will enable others skilled in the art to make and use the same, reference being had to the accompanying drawings, forming part of this specification, in which Figure 1 is a central section of the centering tool.
Figure 2 is a front end view of the same.
Figure 3 is a view of the face of the scroll plate.
Similar letters of reference indicate like parts.

This invention relates to a novel and convenient device for centering and drilling a centre hole in a bar of iron or any piece of timber to be hung and turned in a turning-lathe, which is done with the centering tool quickly and accurately. This tool consists of a drill and crank combined with a screw-feed, which are connected with a scroll chuck for holding the piece to be centred.

A represents the scroll chuck, in the face of which are fitted the three radial sliding jaws *a a a*, fig. 2, and in the back part of which is fitted the helical section B, for contracting and opening the jaws, for which, of itself, I make no claim, as that is well known and in common use. In the axis or centre of the hub of the scroll chuck I fit a hollow screw, C, which encloses a drill, D, upon which it acts by means of a milled ring, *c*, moved by the hand as a "feed" for the point of the drill to bore a central hole in the end of the piece held by the jaws of the chuck. On the outer end of the drill D is a hand crank, *d*, by which it is turned to make a centre hole. It will be seen that when a piece of iron or timber to be centered is fixed in the jaws of the chuck that by turning the hollow or sleeve screw C by means of the milled ring *c*, forming a part of it, the point of the drill D will be moved up to the end of the piece and centre it, and that then, by turning the crank *d* simultaneously with the feed motion of the sleeve screw C, the drill will bore an accurate central hole in the piece, by which it may be hung properly in a turning-lathe.

Having thus described my improvement, I claim as new, and desire to secure by Letters Patent—

The sleeve screw C, and the centre drill D, in combination with the scroll chuck A, constructed, arranged, and operating in connection therewith, substantially as and for the purpose herein specified.

NATHAN PUCKETT.

Witnesses:
F. H. McELFRESH,
D. C. TOLLER.